(12) United States Patent
Rajakarunanayake

(10) Patent No.: US 6,765,881 B1
(45) Date of Patent: Jul. 20, 2004

(54) VIRTUAL L2TP/VPN TUNNEL NETWORK AND SPANNING TREE-BASED METHOD FOR DISCOVERY OF L2TP/VPN TUNNELS AND OTHER LAYER-2 SERVICES

(75) Inventor: Yasantha N. Rajakarunanayake, San Ramon, CA (US)

(73) Assignee: Covad Communications Group, Inc., Santa Clara, CA (US)

( * ) Notice: Subject to any disclaimer, the term of this patent is extended or adjusted under 35 U.S.C. 154(b) by 763 days.

(21) Appl. No.: 09/732,173

(22) Filed: Dec. 6, 2000

(51) Int. Cl.[7] ............................................... H04L 12/28
(52) U.S. Cl. ...................... 370/256; 370/254; 370/389; 370/474
(58) Field of Search ................................. 370/254, 255, 370/256, 338, 392, 389, 474; 709/224

(56) References Cited

U.S. PATENT DOCUMENTS

| | | | |
|---|---|---|---|
| 6,006,259 | A | 12/1999 | Adelman et al. |
| 6,028,867 | A | 2/2000 | Rawson et al. |
| 6,286,049 | B1 | 9/2001 | Rajakarunanayake et al. |
| 6,388,990 | B1 | 5/2002 | Wetzel |
| 6,459,702 | B1 | 10/2002 | Saaverda et al. |
| 6,463,079 | B2 | 10/2002 | Sundaresan et al. |
| 6,463,528 | B1 | 10/2002 | Rajakarunanayake et al. |
| 6,538,997 | B1 * | 3/2003 | Wang et al. ................. 370/256 |
| 6,538,998 | B1 | 3/2003 | Garimella |
| 6,580,718 | B1 | 6/2003 | Chapman |
| 6,584,074 | B1 | 6/2003 | Vasametti et al. |
| 6,587,883 | B1 | 7/2003 | Rajakarunanayake |
| 6,594,695 | B1 | 7/2003 | Vasametti et al. |
| 6,628,623 | B1 * | 9/2003 | Noy ............................ 370/225 |
| 6,636,499 | B1 * | 10/2003 | Dowling ...................... 370/338 |
| 6,697,338 | B1 * | 2/2004 | Breitbart et al. ............ 370/254 |
| 6,701,361 | B1 * | 3/2004 | Meier .......................... 709/224 |
| 2004/0042416 | A1 * | 3/2004 | Ngo et al. ................... 370/254 |
| 2004/0042454 | A1 * | 3/2004 | Zabihi et al. ................ 370/392 |

OTHER PUBLICATIONS

"Layer 2 Tunnel Protocol," http://www.cisco.com/univercd/cc/td/doc/product/software/ios120/120newft/120t/120t1/l2tpt.pdf, Aug. 25, 2000.
"Configuring Virtual Private Networks," http://www.cisco.com/univercd/cc/td/doc/product/software/ios121/121cgcr/dialns_c/dnsprt3/dcdvpn.pdf, Aug. 25, 2000.

* cited by examiner

*Primary Examiner*—Salvatore Cangialosi
(74) *Attorney, Agent, or Firm*—Jung-hua Kuo

(57) ABSTRACT

A virtual L2TP/VPN tunnel network as well as a system and method for automatic discovery of VPN tunnels, such as L2TP tunnels, and other layer-2 services using a method such as one based on the spanning tree protocol are disclosed. The method for automatic discovery of layer-2 services across a network of layer-2 devices generally comprises transmitting an advertisement message on each tunnel of each layer-2 device, the advertisement message containing information for generating a spanning tree based on spanning tree algorithm, receiving advertisement message on the tunnels of each layer-2 device, and processing the received advertisement messages to generate a spanning tree topology of the network of layer-2 devices whereby each layer-2 device in the network automatically discovers layer-2 services of other layer-2 devices on the network. The transmitting is preferably repeated at predetermined configurable intervals.

17 Claims, 6 Drawing Sheets

VIRTUAL L2TP/VPN TUNNEL NETWORK AND SPANNING TREE-BASED METHOD FOR DISCOVERY OF L2TP/VPN TUNNELS AND OTHER LAYER-2 SERVICES

BACKGROUND OF THE INVENTION

1. Field of the Invention

The present invention relates generally to a virtual L2TP/VPN tunnel network and a system and method for automatic discovery of VPN tunnels and other layer-2 services. More specifically, a virtual L2TP/VPN tunnel network as well as a system and method for automatic discovery of VPN tunnels, such as L2TP tunnels, and other layer-2 services using a method such as one based on the spanning tree protocol are disclosed.

2. Description of Related Art

Virtual private network (VPN) generally refers to a private network having a secure encrypted connection configured across a public network. VPN allows organizations such as corporations to utilize a public network as its own virtual private communications tool. VPNs appear as private national or international networks to the customer but physically share backbone trunks with other customers.

Implementing a VPN provides cost efficiency advantages by avoiding the expense of setting up a dedicated secure network while providing interconnectivity among remote branches, departments, and/or users through relatively inexpensive services of an Internet service provider (ISP). In particular, VPNs provide a cost-effective alternative to laying cables, leasing lines, and/or subscribing to frame relay services. Thus, VPNs offer the security of a private network via access control and encryption while enjoying the advantage of economies of scale and built-in management facilities of large public networks. However, utilizing VPNs over public networks typically comes at a cost of greater response time and/or lower reliability.

VPN may utilize a tunneling process that encapsulates and transmits communication packets. Tunneling generally involves transmitting data structured in one protocol format within the format of another protocol. In other words, tunneling allows other types of transmission streams to be carried within the prevailing protocol. With respect to VPN, tunneling typically involves encapsulating a network transmission in an IP (Internet Protocol) packet for secure transmission over an IP network. A tunnel provides a temporary portal for passing data through a system such as a proxy, and ceases to exist when the ends of the connection are closed. IP tunneling entails carrying a foreign protocol within an IP packet. For example, using IP tunneling, IPX (Internetwork Packet Exchange) can be encapsulated and transmitted via TCP/IP.

Examples of VPN tunnels include L2TP (Layer 2 Tunneling Protocol) tunnels, IPSec (IP Security) tunnels, PPTP (Point-to-Point Tunneling Protocol), and GRE (Generic Routing Encapsulation). L2TP is an extension to the point-to-point protocol (PPP) for creating VPNs over the Internet. L2TP is a combination of Microsoft's Point-to-Point Tunneling Protocol and Cisco's Layer 2 Forwarding (L2F) technology. L2TP supports non-IP protocols such as AppleTalk and IPX as well as the IPSec security protocol. IPSec is a security protocol that provides authentication and encryption over the Internet. In contrast to SSL which provides services at layer 4 and secures communications between two applications, IPSec works at layer 3 and secures everything in the network. Because IPSec was designed for the IP protocol, it has wide industry support and is expected to become the standard for virtual private networks (VPNs) on the Internet.

VPN technology typically involves various hardware components such as a network access server (NAS) and a tunnel server. The NAS is often also referred to as an L2TP access concentrator (LAC). The LAC receives incoming calls for dial-in VPNs and places outgoing calls for dial-out VPNs. Typically, the LAC is maintained by an ISP that provides VPN services to its customers. The tunnel server is often also referred to as the home gateway or the L2TP network server (LNS). The tunnel server terminates dial-in VPNs and initiates dial-out VPNs. Typically, the tunnel server is maintained by the ISP customer and is the contact point for the customer network.

When a remote end user or client wishes to connect to the customer tunnel server, the remote end user first establishes a PPP connection to the ISP LAC such as by dialing in to the ISP LAC. Upon receiving the initial PPP request, the LAC determines that the PPP request is to be forwarded onto a tunnel or other medium which can directly reach the PPP network server capable of authentication and authorization of the remote end user. The LAC identifies the tunnel server to which the end user's call is to be forwarded and establishes a tunnel with the identified tunnel server. Finally, the tunnel server authenticates the client username and password and establishes the PPP connection with the remote end user client.

The outgoing tunnel server and tunnel may be selected based on, for example, the end user domain name and/or the DNIS (dialed number identification service) information in the incoming call. If the LAC cannot determine the outgoing tunnel or tunnel server, then access is denied and the incoming session is dropped.

However, for large scale tunnel deployments, an ISP LAC may be within a network of ISP LACs. The other ISP LACs may have configured other distinct tunnels such that a VPN may be established across multiple ISP LACs. However, each LAC needs to be configured with a forwarding database for the tunneling topology so as to be able to establish such VPNs across multiple ISP LACs. Thus, it is desirable to provide a system and method for automatic discovery of VPN tunnels across a network of LACs.

SUMMARY OF THE INVENTION

A virtual L2TP/VPN tunnel network as well as a system and method for automatic discovery of VPN tunnels, such as L2TP tunnels, and other layer-2 services using a method such as one based on the spanning tree protocol are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for automatic discovery of layer-2 services across a network of layer-2 devices generally comprises transmitting an advertisement message by each tunnel or virtual port of each layer-2 device to the logical neighbors of the device in a virtual topology, the advertisement message containing information for generating a spanning tree based on a spanning tree algorithm, receiving advertisement messages on the tunnels of each layer-2 device, and processing the received advertisement messages to generate a spanning tree topology of the network of layer-2 devices whereby each layer-2 device in the network automatically discovers layer-2 services of other layer-2 devices on the network. The transmitting is preferably repeated at predetermined configurable intervals. It is noted that discovery of L2 services such as by domain name or ID is generally analogous to Ethernet-address discovery by a bridge running the spanning tree protocol.

The resulting spanning tree generally includes a root device selected from the network of layer-2 devices, each tunnel associated with the root device being a designated tunnel of the root device on which advertisement messages are transmitted, a root tunnel for each non-root device, a designated device selected from the pair of devices associated with each tunnel, the associated tunnel being the designated tunnel of the designated device, and blocked tunnels for all other tunnels in the network of layer-2 devices, wherein blocked tunnels are blocked from transmitting advertisement messages. Generally, the transmitting of the advertisement message by each tunnel of each layer-2 device is only on root tunnels and designated tunnels of the layer-2 devices. The resulting spanning tree provides a unique path between each pair of layer-2 devices.

The advertisement message transmitted is the best tunnel advertisement message selected from the advertisement message received and from the advertisement message transmitted on that tunnel. In one implementation, the layer-2 service is a tunnel for establishing a virtual private network and the layer-2 devices are L2TP access concentrators wherein the virtual private network between a remote end client and a tunnel server is via L2TP access concentrators in the network according to the spanning tree topology.

The system for automatic discovery of layer-2 services across a network of layer-2 devices generally comprising a plurality of layer-2 devices. The layer-2 devices are in communication with each other to form the network, wherein each layer-2 device is configured to transmit an advertisement message on each tunnel, the advertisement message containing information for generating a spanning tree based on spanning tree algorithm, to receive advertisement messages on the tunnels of each layer-2 device, and to process the received advertisement messages to generate a spanning tree topology of the network of layer-2 devices whereby each layer-2 device in the network automatically discovers layer-2 services of other layer-2 devices on the network.

The spanning tree protocol enables bridges to discover remote MAC addresses. Adapting and implementing the spanning tree protocol into VPN technology facilitates in maintaining tunneling topology and allows the network of LACs or tunnel switches to be more scalable. In addition, the spanning tree provides a unique path between any pair of nodes, provides for self-heals, and allows redundancy to be easily achieved.

A virtual private tunneling network for enabling communication across a virtual private network between a remote end user device and a destination L2TP network server is also disclosed. The virtual private tunneling network generally comprises a tunnel switch network having a plurality of tunnel switches each in communication with at least one other tunnel switch via a tunnel over an IP network, each of the tunnel switches is preconfigured with a list of tunnels with which it is associated and a list of domains corresponding to each tunnel. One of the tunnel switches in the network is in direct communication with a network adapted to establish a PPP session between the remote end user device and the one tunnel switch. In addition, another one of the tunnel switches in the network is in communication with the destination L2TP network server via a corresponding tunnel, whereby communication packets between the remote end user device and the L2TP network server are encapsulated and transmitted via a plurality of tunnels corresponding to a plurality of the tunnel switches via the IP network.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for automatic discovery of VPN tunnels, such as L2TP or IP Sec tunnels, and other layer-2 services using a method based on the spanning tree protocol are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

VPN Technology Overview

Figure 1:
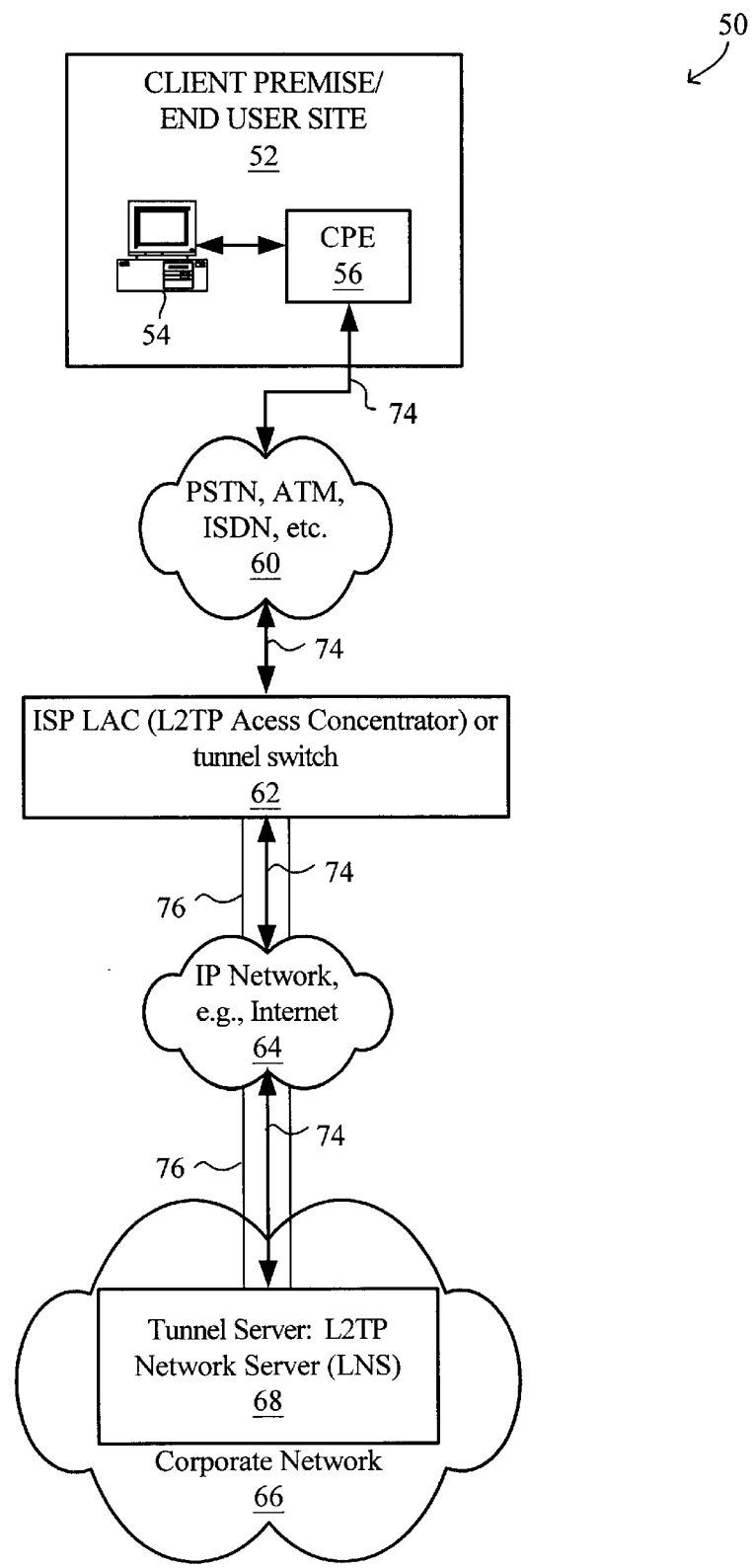
FIG. 1 is a block diagram of an exemplary VPN architecture.

FIG. 1 is a block diagram of an exemplary system 50 implementing a VPN architecture. As shown, the VPN system 50 generally includes a remote end user site 52 having a computer 54 and a client premise equipment 56 such as a modem in communication with an ISP LAC or tunnel switch 62 via a network 60 such as PSTN, ATM, ISDN, etc. Although not expressly shown, a PSTN or ATM network 60 would typically utilize PPP over PSTN or PPPOE or PPP over ATM. The LAC is often also referred to as the L2TP access concentrator (LAC). The LAC receives incoming calls for dial-in VPNs and places outgoing calls for dial-out VPNs. Typically, the LAC is maintained by an ISP that wishes to provide VPN services to its customers. The LAC 62 is in turn in communication with a corporate network 66 via an IP network such as the Internet 64 or other public network. The corporate network 66 includes a tunnel server 68 such as a home gateway or LNS (L2TP network server). The tunnel server terminates dial-in VPNs and initiates dial-out VPNs. Typically, the tunnel server is maintained by the ISP customer and is the contact point for the customer network.

The LAC 62 is a device providing temporary on-demand network access to users. The access is point-to-point typically using networks such as PSTN (public switched telephone network), ISDN (integrated services digital network), or ATM (asynchronous transfer mode). The LAC 62 may also serve as a LAC, LNS, or both. L2TP access concentrator (LAC) may be an L2TP NAS device to which the client directly connects and whereby PPP frames are tunneled to the L2TP network server (LNS). The client generally refers to the PPP client or peer, i.e., the instigator of the PPP session. The LAC 62 needs only implement the media over which L2TP is to operate to pass traffic to one or more LNSs. It may tunnel any protocol carried within PPP. The LAC is the initiator of incoming calls and the receiver of outgoing calls.

In a dial-in scenario, a remote end user dials in to the LAC 62 and the LAC 62 forwards the call to the tunnel server 68 using a VPN tunnel 76. In a dial-out scenario, the tunnel server 68 initiates a VPN tunnel 76 to the LAC 62 and the LAC 62 dials out to the clients 54.

When the remote end user dials in to the LAC 62 to be tunneled to the tunnel server 68, the LAC 62 identifies the tunnel server 68 to which the end user's call is to be forwarded. The outgoing tunnel 68 may be selected based on, for example, the user domain name and/or the DNIS information in the incoming call.

If the LAC 62 is configured to forward VPN calls based on the user domain name, the user typically uses a username of the form username@domain. The LAC 62 compares the user domain name to the domain names for which it is configured to search. When the LAC 62 finds a match, the LAC 62 forwards the user call to the proper tunnel server.

Alternatively or additionally, if the LAC 62 is configured to forward VPN calls based on the user DNIS information (dialed number identification service), the LAC 62 identifies the user DNIS information and forwards the call to the proper tunnel server 68. The ability to select a tunnel based on DNIS provides additional flexibility to the network service provider that offers VPN services and to the corporations that use the VPN services. In particular, instead of or in addition to having to use only the domain name for tunnel selection, tunnel selection can be based on the dialed number. With this feature, a corporation that may have only one domain name can provide multiple phone numbers for users to dial in to the LAC 62 at the service provider POP (point of presence). The service provider can select the tunnel to the appropriate services or portion of the corporate network based on the dialed number.

When a service provider has multiple AAA (administration, authorization, and authentication) servers configured, VPN tunnel authorization searches based on domain name can be time consuming and may result in the client session timing out. To provide more flexibility, a service provider can configure the LAC 62 to perform tunnel authorization search by domain name only, by DNIS only, or by both in a specified order.

When the remote end user wishes to connect to the customer tunnel server 68, the remote end user first establishes a PPP connection 74 to the ISP LAC 62 such as by dialing in to the ISP LAC 62 via the network 60. Upon receiving the initial PPP request, the LAC 62 determines that the PPP request is to be forwarded onto a tunnel or other medium which can directly reach the PPP network server capable of authentication and authorization of the remote end user. The LAC 62 identifies the tunnel server 68 to which the end user's call is to be forwarded and establishes a tunnel 76 with the identified tunnel server 68. Finally, the tunnel server 68 authenticates the client username and password and establishes the PPP connection 74 with the remote end user client.

Using L2TP tunneling as an example to describe the internetworking in implementing L2TP, an ISP or other access service can create a virtual tunnel to link a customer's remote sites and/or remote uses with corporate home networks. The LAC 62 located at the ISP's POP exchanges PPP messages with the remote user 54 and communicates utilizing L2TP requests and responses with the customer tunnel server 68 to set up tunnels 76. L2TP passes protocol-level packets through the virtual tunnel 76 between endpoints of a point-to-point connection. Frames from remote users 54 are accepted by the ISP's POP, stripped of any linked framing or transparency bytes, encapsulated in L2TP and forwarded over the appropriate tunnel 76. The customer's tunnel server 68 accepts these L2TP frames, strips the L2TP encapsulation, and processes the incoming frames for the appropriate interface.

Network of LACs

Figure 2:
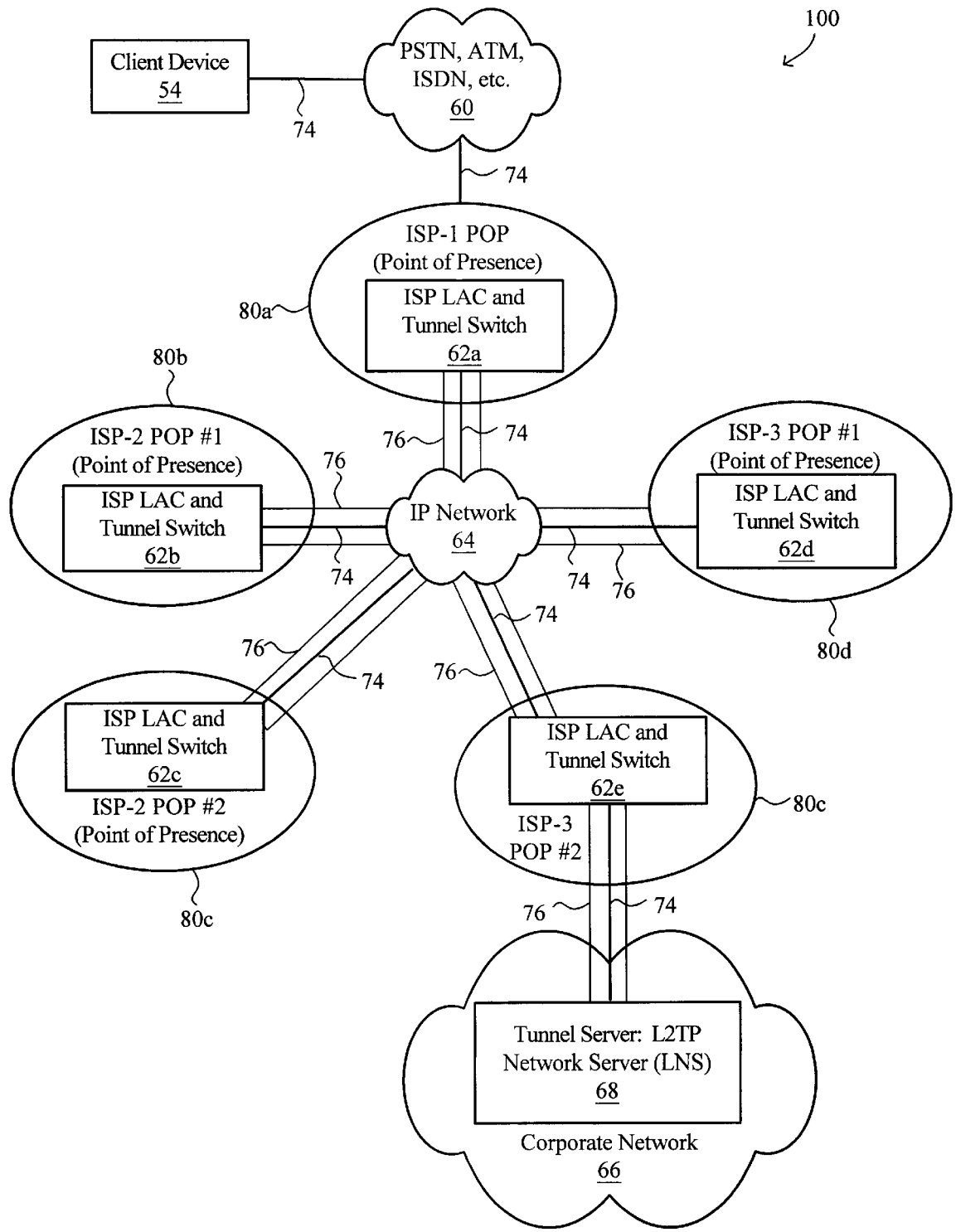
FIG. 2 is a block diagram illustrating a system with relatively large scale tunnel deployments containing a network of ISP LACs.

FIG. 2 is a block diagram illustrating an exemplary system 100 having a network of ISP LACs 62 for a larger scale tunnel deployments. It is to be understood that certain components of the network system 100 are not shown for purposes of clarity.

In the network of LACs shown, ISP-1 has one POP (point of presence) 80a. In addition, each of ISP-2 and ISP-3 has two POPs 62b, 62c and 62d, 62e, respectively. Each ISP POP 80a–e has a corresponding ISP LAC and tunnel switch 62a–e, respectively. It is noted that although the LAC and tunnel switch is shown as a single device, the LAC and tunnel switch may be separate devices. The LACs 62a–e are in communication with each other via the Internet 64 and/or via a direct, such as via a dedicated T1 line, or other connection. Although not shown, any two LACs may be in direct communication, i.e., outside of the IP network 64, via a direct pipe such as via DS3 lines.

The client device 54 is in communication with the ISP LAC 62a via the network 60. The network 60 may be, for example, PSTN, ATM, or ISDN as described above. The corporate network 66 includes a tunnel server or LNS 68 that is in communication with the LAC 62e at ISP-3 POP #2 80e. Although only one corporate network 66 is shown, each ISP LAC 62 typically is in communication with one or more corresponding corporate networks such that a tunnel extends between each ISP LAC 62 and the corresponding corporate network for establishing a VPN. In other words, each ISP LAC 62 is configured with various tunnels for its corresponding corporate networks. PPP connections 74 are established between pairs of nodes as shown and tunnels 76 are established between pairs of LACs 62 as shown as well as between the LACs 62 and their corresponding corporate networks 66.

The tunnel switch at each ISP POP is typically preconfigured with a list of tunnels with which it is associated and a list of domains corresponding to each tunnel. The tunnel switches in the network of LACs and tunnel switches learn of the other ISP POP's list of domains by transmitting and processing tunnel advertisement messages. The tunnel advertisement messages may be generated and processed by each tunnel switch using the spanning tree algorithm, for example. Execution of the spanning tree algorithm results in a spanning tree of the tunnels. Any other method of discovering tunnels or other Layer 2 services may be implemented. For example, although not preferred, each tunnel switch may be manually configured with a list of appropriate tunnels and domains.

By learning the other ISP POP's list of domains, each ISP POP can utilize the network of tunnels to establish VPNs. It is noted that, although various ISPs are shown in FIG. 2, the ISPs need not share facilities with other ISPs. In other words, the method for discovering Layer 2 services described herein may be utilized within the network of tunnels that belong to a single or any number of ISPs. In addition, because the domains may be arbitrarily distributed among multiple LACs, in the most general case, there may be a spanning tree corresponding to each domain.

With the network of ISP LACs 62, a VPN may be established across multiple ISP LACs 62 such as via the Internet 64. The least cost path from ISP-1 POP 80a to the corporate network 66 may be via LAC 62d of ISP-3 POP #1 80d and LAC 62e of ISP-3 POP #2 80e. Alternatively, the least cost path from ISP-1 POP 80a to the corporate network 66 may be via the Internet 64 and LAC 62e of ISP-3 POP #2 80e.

To effectively utilize the network of LACs 62, Each LAC 62 needs information regarding the other LACs 62 as well as their VPN tunnels in order to established a VPN across multiple ISP LACs 62. The network of LACs 62 may automatically discover VPN tunnels using a method based on the spanning tree protocol. The discovered available VPN tunnels may then be stored in a tunneling topology database.

The spanning tree protocol enables bridges to discover remote MAC addresses. Implementing the spanning tree protocol into VPN technology facilitates in maintaining tunneling topology and allows the network of LACs or tunnel switches to be more scalable. In addition, the spanning tree provides a unique path between any pair of nodes, provides for self-heals, and allows redundancy to be easily achieved. The following is a general overview of the spanning tree protocol and algorithm.

A general overview of the spanning tree protocol and algorithm will be first be described below with reference to FIG. 3 and will serve as basis for subsequent discussion of the system and method for automatic discovery of VPN tunnels using a method based on the spanning tree protocol.

Spanning Tree Protocol Using Spanning Tree Algorithm

The spanning tree algorithm is a bridge algorithm used by the spanning tree protocol in transparent bridges. The spanning tree algorithm dynamically determines the best path from source to destination by creating a spanning tree. The spanning tree algorithm facilitates in avoiding bridge loops that can cause the bridges to misinterpret results. Bridge loops result when two or more paths link one segment to another. The spanning tree that results from implementation of the spanning tree algorithm defines a loop-free subset of a network topology. In other words, the spanning tree protocol enables a learning bridge to dynamically work around loops in a network topology by creating a spanning tree.

A learning bridge is a bridge that performs MAC address learning to reduce traffic on the network. In general, learning bridges manage a database of MAC addresses and the interfaces associated with each address. MAC address learning entails storing the source MAC address of each received packet so that future packets destined for that address can be forwarded only to the bridge interface on which that address is located. Packets destined for unrecognized addresses are forwarded out on every bridge interface. This scheme helps minimize traffic on the attached LANs.

In the spanning tree algorithm, bridges exchange bridge protocol data unit (BPDU) messages with other bridges to detect loops and then remove the loops by shutting down selected bridge interfaces. BPDU messages are also referred to as advertisement messages. IEEE 802.1 Spanning-Tree Protocol standard is an IEEE specification that describes the spanning tree algorithm in detail and is hereby incorporated in its entirety by reference. The algorithm described by IEEE 802.1 supports bridge domains and allows the bridge to construct a loop-free topology across an extended LAN.

The BPDU is a spanning-tree protocol hello packet that is sent out at configurable intervals to exchange information among bridges in the network. The spanning tree algorithm is a distributed algorithm that elects a single bridge to be the root bridge. To generate the spanning tree, the spanning tree algorithm calculates the cost for the least cost path from each bridge to the root bridge and designates a bridge for each LAN from among the bridges that reside on that LAN such that the designated bridge is the bridge with the least cost path to the root bridge. The cost may be determined using any suitable criteria such as number of hops, etc.

One or more ports of each bridge are selected to be included in the spanning tree. Such ports are in a forwarding state and include root and designated ports. The root port of each bridge gives the least cost path from the bridge to the root bridge. The designated ports are ports on a LAN on which the bridge has been selected as the designated bridge for that LAN. The bridge selected to be the designated bridge for a LAN is the bridge that gives the least cost path from the LAN segment to the root bridge. All other ports, i.e. those that are not included in the spanning tree, are in a blocked state. Data traffic is discarded upon receipt from ports in a blocked state and is not forwarded onto ports that are in the blocked state.

In the spanning tree algorithm, the root bridge is selected as the bridge with the numerically lowest bridge ID. However, it is to be understood that any bridge may be the root bridge and any suitable scheme may be utilized to designate a bridge as the root bridge.

Initially, each bridge assumes that it is the root bridge and transmits BPDU configuration packets or messages on each of its ports. Each BPDU packet contains the transmitting bridge ID, the transmitting port ID, the cost to what the transmitting bridge believes to be the root bridge, and the ID of what the transmitting bridge believes to be the root bridge. Each bridge also receives BPDU configuration messages on each of its ports. Each port saves the best configuration message from among all messages received on that port and the message transmitted on that port by the bridge.

If a bridge receives a better configuration message on a LAN than the one it would transmit, it no longer transmits configuration messages. Therefore, when the algorithm stabilizes, only the designated bridge for that LAN transmits configuration message on that LAN.

Given two configuration messages M1 and M2, M1 is better than M2 if the root bridge ID listed in M1 is numerically lower than the root bridge ID listed in M2. As noted above, any other suitable scheme may be utilized to designate a bridge as the root bridge. If the roots bridge IDs are equal, then M1 is better than M2 if the cost listed in M1 is less than the cost listed in M2. However, if the root bridge ID and the cost to the root are equal, M1 is better than M2 if the transmitting bridge ID listed in M1 is numerically lower than the transmitting bridge ID listed in M2. If the root bridge ID, cost to the root, and transmitting bridge ID are equal, then M1 is better than M2 if the port ID in M1 is numerically lower than that of M2. In other words, port identifiers are used as a tie-breaker and such a situation is typically encountered when a bridge has multiple ports attached to the same LAN segment.

It is to be understood that the above description of the spanning tree algorithm is but one exemplary implementation. In addition, various bridge and/or network-wide parameters may also be included and utilized in BPDU configuration messages. Such parameters may include protocol identifier, version number, message type, various flags such as the TC (topology change notification) flag and/or the TCA (topology change notification acknowledgement) flag, max age, hello time, forward delay, bridge priority, port priority, long forwarding database timer, an age field, etc.

Figure 3:
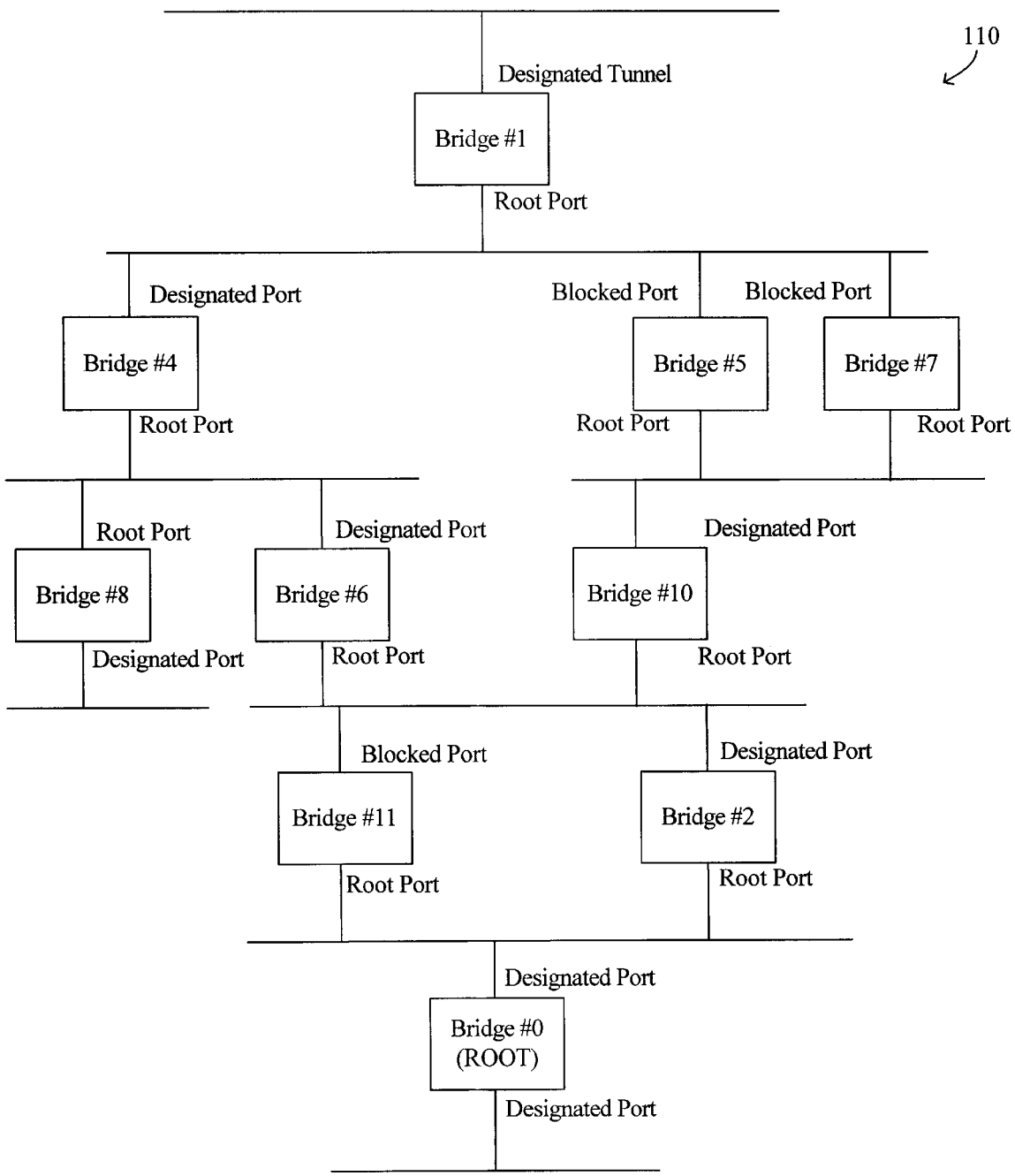
FIG. 3 is a block diagram illustrating a spanning tree generated from an exemplary network topology using the spanning tree protocol.

FIG. 3 is a block diagram illustrating a spanning tree generated from an exemplary network topology 110 using the spanning tree protocol. As shown, Bridge #0 has numerically the lowest bridge ID and is thus the designated root. Each of the other bridges #1–11 includes a root port that gives the least cost path from the bridge to the root bridge. The criteria utilized for determining the cost for a path is the number of hops. Each LAN segment is in communication with a designated port at a designated bridge that gives the least cost path from the LAN segment to the root bridge. The root and the designated ports are included in the spanning tree and are in a forwarding state. All other ports are blocked ports and are not included in the spanning tree.

Discovery of VPN Tunnels and/or Other Layer 2 Services Using a Method Based on the Spanning Tree Protocol The present method for discovery of L2 services such as by domain name or ID is generally analogous to the above-described Ethernet-address discovery by a bridge running the spanning tree protocol. The spanning tree algorithm is adapted for use in the discovery of VPN tunnels and/or other Layer 2 services. The spanning tree algorithm facilitates each learning LAC to dynamically determine the best path from source to destination by creating a spanning tree. In general, each learning LAC manages a database of tunnels and associated domains. The spanning tree algorithm facilitates in avoiding tunnel loops that may cause the LACs to misinterpret results. Tunnel loops result when two or more paths link the source and destination LACs. The spanning tree that results from implementation of the spanning tree algorithm defines a loop-free subset of a virtual network topology. In other words, the spanning tree protocol enables a learning LAC to dynamically work around loops in a network topology by creating a spanning tree.

In the present tunnel discovery scheme, LACs exchange tunnel advertisement messages analogous to the BPDU messages with other LACs to detect loops and to remove loops by shutting down selected tunnels for selected domains. The tunnel advertisement messages are preferably transmitted at configurable intervals to exchange information among the LACs in a virtual network. The spanning tree algorithm is a distributed algorithm and is implemented in a manner similar to that described above for transparent bridges.

Figure 4:
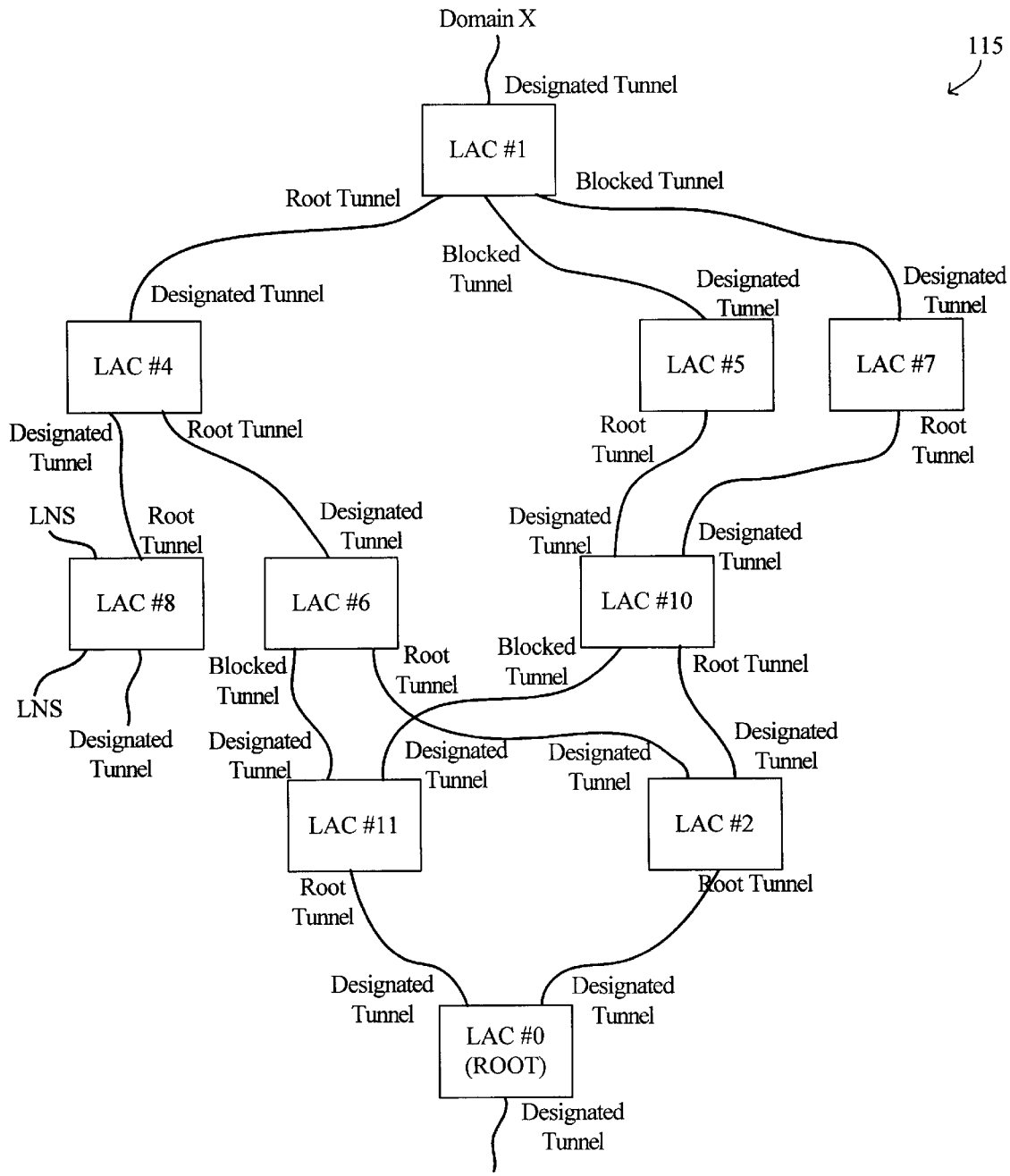
FIG. 4 is a block diagram illustrating a tunneling spanning tree for an exemplary virtual L2TP/VPN tunnel network generated using the spanning tree protocol.

FIG. 4 is a block diagram illustrating a tunneling spanning tree 115 for an exemplary virtual L2TP/VPN tunnel network generated using a method similar to the spanning tree protocol described above. As noted above, because the domains may be arbitrarily distributed among any number of the LACs in the virtual network, in the most general case, there may be a distinct spanning tree corresponding to each domain. Accordingly, the spanning tree shown in FIG. 4 may correspond to one or more domains and different spanning trees may be generated for other domains.

As shown, LAC #0 has numerically the lowest LAC ID and is thus the designated root LAC. Each of the other LACs #1–11 includes a root tunnel that gives the least cost path from that LAC to the root LAC. The criteria utilized for determining the cost for a tunneling path may be the number of hops. In addition, each tunnel is in communication between two LACs, one of which is a designated LAC that gives the least cost path from the tunnel to the root LAC. As shown in FIG. 4, the tunnel is a designated tunnel or designated virtual port for the designated LAC of that tunnel. The root and the designated tunnels are included in the spanning tree and are in a forwarding state. All other tunnels are blocked tunnels and are not included in the spanning tree.

Figure 5:
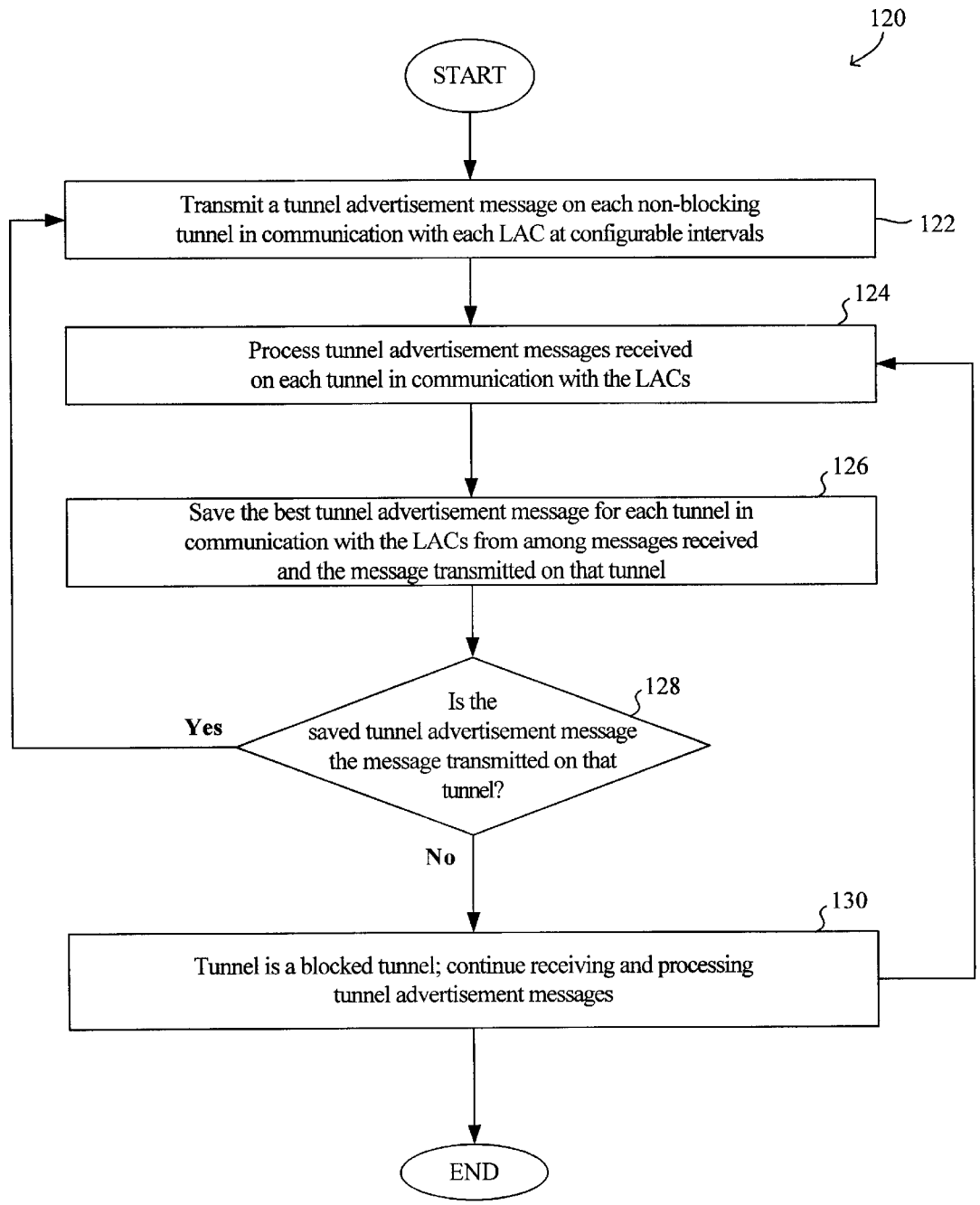
FIG. 5 is a flow chart illustrating a method for automatic discovery of VPN tunnels and/or other layer-2 services using a method based on the spanning tree protocol.

FIG. 5 is a flow chart illustrating a process 120 for automatic discovery of VPN tunnels and/or other layer-2 services using a method based on the spanning tree protocol. At block 122, each LAC transmits a tunnel advertisement message similar to a BPDU message on each of its non-blocking tunnel. Block 122 is preferably repeated at configurable intervals such that a stabilized spanning tree results and the system is self-healing in the event that any LAC or tunnel link goes down. The tunnel advertisement message is a packet for the exchange of information among the LACs in the network of LACs.

The spanning tree-based process 120 is a distributed algorithm that elects a single LAC to be the root LAC. To generate the spanning tree, the spanning tree algorithm calculates the cost for the least cost path from each LAC to a root LAC and designates a LAC for each tunnel from the two LACs that are in direct communication with that tunnel such that the designated LAC is the LAC with the least cost path to the root LAC. The cost may be determined using any suitable criteria such as number of hops, transmission time, etc.

Initially, each LAC may assume that it is the root LAC and transmits tunnel advertisement configuration packets or messages to each of its logical neighbors on its tunnels. Each tunnel advertisement message may include various parameters and preferably includes the transmitting LAC ID, the tunnel ID of the tunnel on which the message is transmitted, the ID of what the transmitting LAC considers to be the root LAC, and the cost to that root LAC. Various other parameters may alternatively or additionally be included in the tunnel advertisement message. In addition, each tunnel advertisement message preferably also includes a list of domains, tunnel servers, and/or tunnel names for the tunnel servers to which the advertising LAC corresponds.

Each LAC receives and processes tunnel advertisement messages on its tunnels at block 124. In particular, the LAC compares the received tunnel advertisement message received on a tunnel with the tunnel advertisement message that tunnel would transmit. If the LAC receives a better tunnel advertisement message on a tunnel than the one it would transmit on that tunnel, the LAC no longer transmits tunnel advertisement messages on that tunnel and that tunnel becomes a blocked tunnel. Therefore, when the spanning tree algorithm stabilizes, only the designated LAC for that tunnel transmits tunnel advertisement messages on that tunnel.

The following is an example of a method for comparing two tunnel advertisement messages T1 and T2 according to one preferred embodiment. It is to be understood that any other suitable method for comparing two tunnel advertisement messages may be implemented. In particular, given two tunnel advertisement messages T1 and T2, T1 is better than T2 if the root LAC ID listed in T1 is numerically lower than the root LAC ID listed in T2. As noted above, any other suitable scheme may be utilized to designate a LAC as the root LAC. If the roots LAC IDs are equal, then T1 is better than T2 if the cost listed in T1 is less than the cost listed in T2. However, if the root LAC ID and the cost to the root are equal, T1 is better than T2 if the transmitting LAC ID listed in T1 is numerically lower than the transmitting LAC ID listed in T2. If the root LAC ID, cost to the root, and transmitting LAC ID are equal, then T1 is better than T2 if the tunnel ID in T1 is numerically lower than that of T2. In other words, tunnel identifiers are used as a tie-breaker.

At block 126, for each tunnel of each LAC, the LAC saves the best tunnel advertisement message for that tunnel from among all such messages received on that tunnel as well as the tunnel advertisement message transmitted on that tunnel by the LAC.

At block 128, the LAC determines if the saved tunnel advertisement message is the message transmitted on that tunnel. If the saved tunnel advertisement message is not the message transmitted on that tunnel, then the tunnel becomes a blocked tunnel at block 130 and the tunnel continues to receive and process tunnel advertisement messages at block 124. Alternatively, if the saved tunnel advertisement message is the message transmitted on that tunnel, then the tunnel continues to transmit tunnel advertisement messages at configurable intervals at block 122 and to receive and process tunnel advertisement messages at block 124.

It is to be understood that various other mechanisms that preferably although not necessarily implement the spanning tree algorithm for maintaining the tunnel topology in the network of LACs may be utilized. In addition, the spanning tree-based or other suitable method for automatic discovery of VPN tunnels may also be applied toward other layer-2 services.

Figure 6:
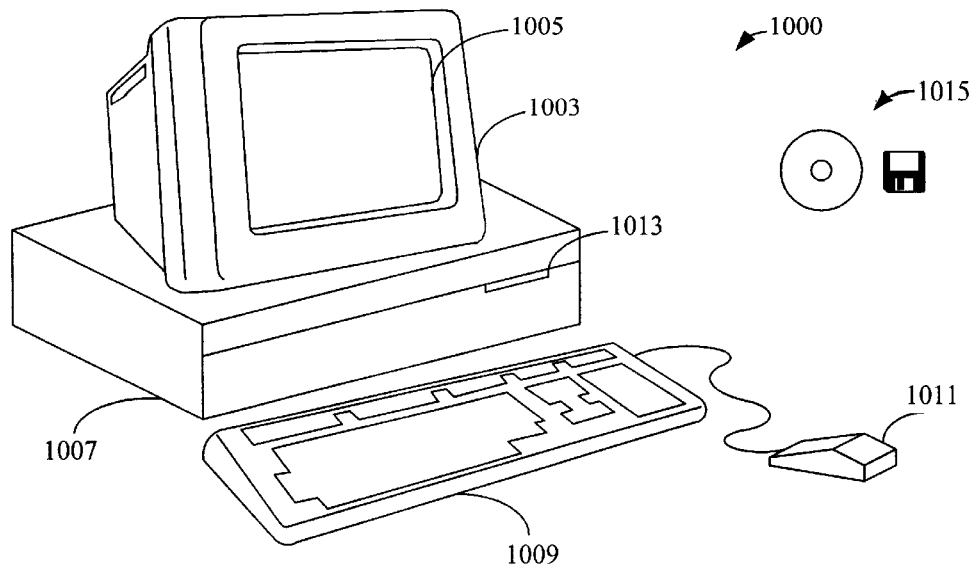
FIG. 6 illustrates an example of a computer system that can be utilized with the various embodiments of method and processing described herein.
Figure 7:
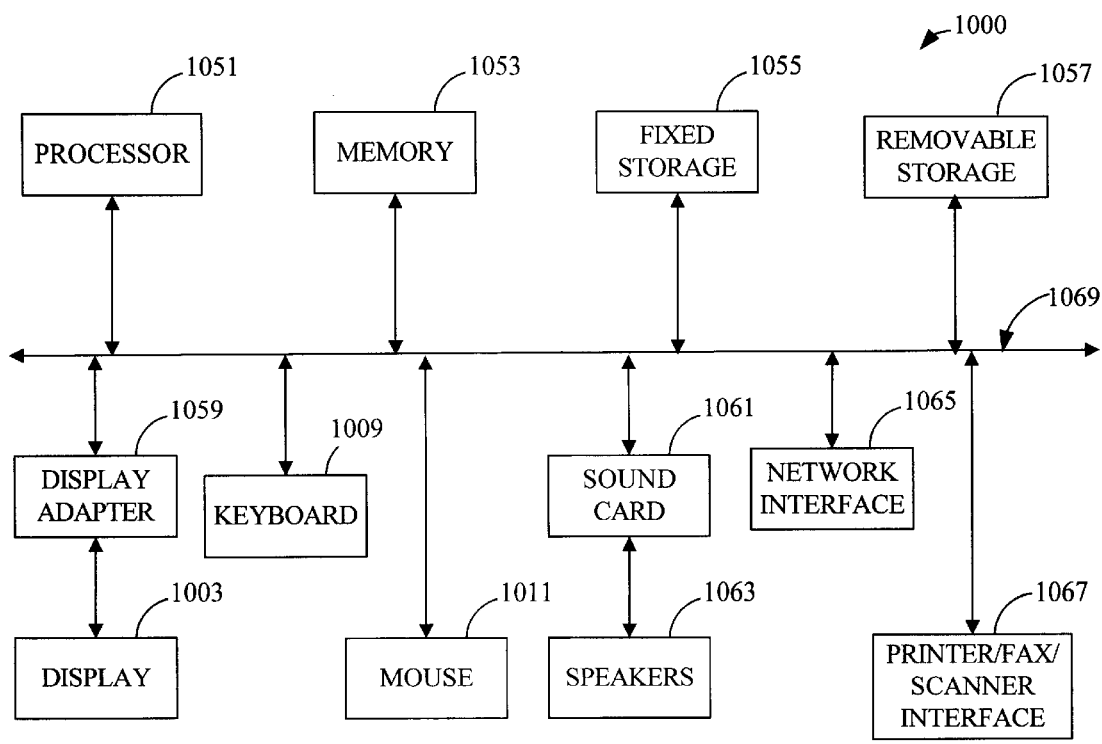
FIG. 7 illustrates a system block diagram of the computer system of FIG. 6.

FIGS. 6 and 7 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instruction, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

The computer system 1000 may be illustrative of the computer system of the service provider, the client, or the remote end-user or customer.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for automatic discovery of layer-2 services across a network of layer-2 devices, comprising:
   transmitting an advertisement message on each tunnel in communication with each layer-2 device, the advertisement message containing information for generating a spanning tree based on spanning tree algorithm;
   receiving advertisement message via the tunnels in communication of each layer-2 device; and
   processing the received advertisement messages to generate a spanning tree topology of the network of layer-2 devices whereby each layer-2 device in the network automatically discovers layer-2 services of other layer-2 devices on the network.

2. The method for automatic discovery of layer-2 services of claim 1, wherein the spanning tree comprises:
   a root device selected form the network of layer-2 devices, each tunnel in communication with the root device being a designated tunnel on which advertisement messages are transmitted;
   a root tunnel for each non-root device,
   a designated device selected from a pair of devices associated with each tunnel, the associated tunnel being the designated tunnel of the designated device, and
   blocked tunnels for all other tunnels of the devices in the network of layer-2 devices, wherein blocked tunnels are blocked from transmitting advertisement messages.

3. The method for automatic discovery of layer-2 services of claim 2, wherein the transmitting of the advertisement message by each tunnel of each layer-2 device is only on root tunnels and designated tunnels of the layer-2 devices.

4. The method for automatic discovery of layer-2 services of claim 1, wherein the spanning tree provides a unique path from each pair of layer-2 devices.

5. The method for automatic discovery of layer-2 services of claim 1, wherein the transmitting is repeated at predetermined intervals.

6. The method for automatic discovery of layer-2 services of claim 1, wherein the advertisement message transmitted is the best tunnel advertisement message selected from the advertisement message received and from the advertisement message transmitted on the tunnel.

7. The method for automatic discovery of layer-2 services of claim 1, wherein the layer-2 service is a tunnel for establishing a virtual private network.

8. The method for automatic discovery of layer-2 services of claim 7, wherein the layer-2 devices are L2TP access concentrators and wherein the virtual private network between a remote end client and a tunnel server is via L2TP access concentrators in the network according to the spanning tree topology.

9. A system for automatic discovery of layer-2 services across a network of layer-2 devices, comprising a plurality of layer-2 devices in communication with each other to form the network, wherein each layer-2 device is configured to transmit an advertisement message on each tunnel associated with the device, the advertisement message containing information for generating a spanning tree based on spanning tree algorithm, to receive advertisement messages on the tunnels in communication with each layer-2 device, and to process the received advertisement messages to generate a spanning tree topology of the network of layer-2 devices whereby each layer-2 device in the network automatically discovers layer-2 services of other layer-2 devices on the network.

10. The system for automatic discovery of layer-2 services of claim 9, wherein the spanning tree comprises:
    a root device selected form the network of layer-2 devices, each tunnel in communication with the root device being a designated tunnel on which advertisement messages are transmitted;
    a root tunnel for each non-root device,
    a designated device selected from a pair of devices associated with each tunnel, the associated tunnel being the designated tunnel of the designated device; and
    blocked tunnels for all other tunnels of the devices in the network of layer-2 devices, wherein blocked tunnels are blocked from transmitting advertisement messages.

11. The system for automatic discovery of layer-2 services of claim 10, wherein the advertisement message transmitted on each tunnel of each layer-2 device is only on root tunnels and designated tunnels of the layer-2 devices.

12. The system for automatic discovery of layer-2 services of claim 9, wherein the spanning tree provides a unique path from each pair of layer-2 devices.

13. The system for automatic discovery of layer-2 services of claim 9, wherein each layer-2 device is configured to repeat the transmission of advertisement messages predetermined intervals.

14. The system for automatic discovery of layer-2 services of claim 9, wherein the advertisement message transmitted is the best tunnel advertisement message selected from the advertisement message received and from the advertisement message transmitted on the tunnel.

15. The system for automatic discovery of layer-2 services of claim 9, wherein the layer-2 service is a tunnel for establishing a virtual private network.

16. The system for automatic discovery of layer-2 services of claim 15, wherein the layer-2 devices are network access servers and wherein the virtual private network between a remote end client and a tunnel server is via network access servers in the network according to the spanning tree topology.

17. A virtual private tunneling network for enabling communication across a virtual private network between a remote end user device and a destination L2TP network server, comprising:
    a tunnel switch network comprising a plurality of tunnel switches each in communication with at least one other tunnel switch via a tunnel over an IP network, each of said tunnel switches is preconfigured with a list of tunnels with which it is associated and a list of domains corresponding to each tunnel;
    wherein one of said tunnel switches is in direct communication with a network adapted to establish a PPP session between the remote end user device and said one tunnel switch and wherein another one of said tunnel switches is in communication with the destination L2TP network server via a corresponding tunnel,
    whereby communication packets between the remote end user device and the L2TP network server are encapsulated and transmitted via a plurality of tunnels corresponding to a plurality of said tunnel switches via the IP network.

\* \* \* \* \*